United States Patent
Rivero-Jiménez et al.

(10) Patent No.: US 7,220,443 B2
(45) Date of Patent: May 22, 2007

(54) METHOD FOR MAKING INSTANT MASA

(75) Inventors: Carmela Rivero-Jiménez, Anzures (MX); Adriana Quintanar-Guzmán, Toluca (MX)

(73) Assignee: Sabritas, S. de R.L. de C.V., Col. Bosques de las Lomas (MX)

( * ) Notice: Subject to any disclaimer, the term of this patent is extended or adjusted under 35 U.S.C. 154(b) by 78 days.

(21) Appl. No.: 11/054,845

(22) Filed: Feb. 10, 2005

(65) Prior Publication Data

US 2006/0177557 A1  Aug. 10, 2006

(51) Int. Cl.
*A21D 2/00* (2006.01)

(52) U.S. Cl. ............ 426/549; 426/455; 426/463; 426/465; 426/506; 426/508; 426/622

(58) Field of Classification Search ............ None
See application file for complete search history.

(56) References Cited

U.S. PATENT DOCUMENTS

| | | | |
|---|---|---|---|
| 2,584,893 A | 2/1952 | Lloyd et al. |
| 2,704,257 A | 3/1955 | Diez de Sollano et al. |
| 3,369,908 A | 2/1968 | Gonzalez et al. |
| 3,404,986 A | 10/1968 | Wimmer et al. |
| 3,730,732 A | 5/1973 | Rubio et al. |
| 3,859,452 A | 1/1975 | Mendoza |
| 4,513,018 A | 4/1985 | Rubio |
| 4,594,260 A | 6/1986 | Vaqueiro et al. |
| 4,623,548 A | 11/1986 | Willard |
| 4,985,269 A | 1/1991 | Irvin et al. |
| 5,395,637 A | 3/1995 | Reec |
| 5,401,522 A | 3/1995 | Reeg |
| 5,532,013 A | 7/1996 | Martinez-Bustos et al. |
| 5,558,886 A | 9/1996 | Martinez-Bustos et al. |
| 5,558,898 A | 9/1996 | Sunderland |
| 5,652,010 A | 7/1997 | Gimmler et al. |
| 5,662,901 A | 9/1997 | Tobey, Jr. et al. |
| 6,001,409 A | 12/1999 | Gimmler et al. |
| 6,025,011 A | 2/2000 | Wilkinson et al. |
| 6,056,990 A | 5/2000 | Delrue et al. |
| 6,068,873 A | 5/2000 | Delrue et al. |
| 6,428,828 B1 | 8/2002 | Jackson et al. |
| 6,491,959 B1 | 12/2002 | Chiang et al. |
| 6,638,554 B1 | 10/2003 | Rubio et al. |
| 2002/0022076 A1 | 2/2002 | Lanner et al. |
| 2003/0198725 A1 | 10/2003 | Cardenas et al. |
| 2005/0214428 A1 | 9/2005 | Gizaw et al. |

FOREIGN PATENT DOCUMENTS

| WO | WO 97/29647 A | 8/1997 |
|---|---|---|
| WO | WO 00/45647 | 8/2000 |
| WO | WO 03/045154 A1 | 6/2003 |

*Primary Examiner*—Lien Tran
(74) *Attorney, Agent, or Firm*—Carstens & Cahoon, LLP; Colin P. Cahoon

(57) ABSTRACT

A process for the production of fresh masa, nixtamalized flour and derived products. The invention is a new process for production of corn masa (dough) to be used in the production of tortillas, fried or baked tortilla chips, tostadas, or corn chips. The new process produces masa directly from raw materials without the traditional cooking and steeping steps. It utilizes a series of processing steps including milling, blending, hydration, cooking and continuous cooling to stop gelatinization. The new process uses very little water and emits no waste water.

27 Claims, 1 Drawing Sheet

METHOD FOR MAKING INSTANT MASA

BACKGROUND OF THE INVENTION

1. Technical Field

The present invention refers to an accelerated and environmentally advantageous process for nixtamalization of corn for the preparation of tortillas, tortilla chips, corn chips, and the like. The invention uses specific processing steps to process ground corn fractions mixed with various gelatinization agents as a substitute for the traditional nixtamalization process.

2. Description of Related Art

Corn was the principal source of food for the pre-Columbian civilizations of the New World. Today corn tortillas and derivative products are still the staple food of Mexico and Central America. Also, corn tortilla, corn chips, and tortilla chips have widely penetrated the market of the United States and some countries of Asia and Europe.

Nixtamalization, also known as alkaline cooking, is the traditional process for making corn masa used as the base ingredient for many Mexican-style corn products, such as corn tortillas, tortilla chips, taco shells, tostadas, tamales, and corn chips. It is believed that ancient Central Americans cooked maize in a dispersion of wood ashes or lime to produce corn tortillas, their major form of bread. This ancient technique, having undergone little changes, still involves cooking and steeping whole kernel corn in a solution of lime (calcium hydroxide). Nixtamalization transforms corn so it can be stone ground to form dough called masa that is subsequently sheeted, formed and cut in preparation of tortillas and related snack or food products.

The traditional method to process corn into tortillas (nixtamalization) goes back to early Mesoamerican civilizations, and the basic steps of the process have remained basically unaltered since. In the traditional process, whole corn is cooked in a boiling water-lime (or water-ash) solution for a short time (5–45 min) and steeped in this solution, as it cools, for a period of 12 to 18 hours. The cooking liquor, called nejayote, is discarded; with it is lost the fraction of the pericarp and germ dissolved in the nejayote. The cooked, steeped, and drained corn grains (nixtamal) are washed to remove excess lime. Here again, a part of pericarp and germ material is lost. The total corn fraction lost varies from 5 to 15%. The highly alkaline (pH 11–12) nejayote, is rich in corn solids and excess lime and is a waste product of both traditional nixtamalization and instant masa flour production. The nixtamal is ground with a pestle and stone into masa. Finally, the masa is flattened into thin disks that are cooked on a hot griddle for 30–60 seconds on each side to produce tortillas. Tortillas prepared by the traditional method just described generally show excellent Theological characteristics, such as puffing and elastic strength.

The major disadvantage of nixtamalization of whole kernel corn is related to alkaline waste and wastewater disposal. The cook steep liquor, nejayote, is an unavoidable by-product of the nixtamalization procedures and is a potential dangerous environmental effluent due to its composition and alkalinity. The proper disposal of the excess wastewater generated during nixtamalization is a major concern during commercial masa production, because wastewater discharge must typically meet specific regulatory requirements. As a result, methods of nixtamalizing corn that reduce effluent production would be both environmental and economically desirable.

Alkaline cooking, steeping and washing of corn also cause partitioning of corn in solids between the masa and the wastewater. Loss of corn solids (i.e., yield loss) during nixtamalization and effluent processing and clean-up costs are considerable. In a commercial operation, corn solids loss has been estimated to vary between 5 and 15% depending on the type of corn. The effluent generated (nejayote) is a potential pollutant because of its composition and characteristics. Nejayote is highly alkaline (pH 11–12), and its solids fraction contains about 75% nonstarch polysaccharides, 11% starch and 1.4% protein and high calcium levels. Nejayote has a chemical oxygen demand (COD) of about 25,000 mg/L, a biological oxygen demand (BOD) of 8,100 mg/L, and a suspended solids content of 20,000 mg/L. In addition to a high BDO and COD, nejayote contains nearly 310 mg of nitrogen and 180 mg of phosphorus per liter. Commercial alkaline corn processing facilities discharge alkaline wastewater in large sedimentation tanks or lagoons for disposal. Some operations dispose of some of the water by irrigating cropland or grass. Sedimentation and microbial degradation of corn solids accomplish wastewater-cleaning operations. Due to alkalinity, wastewater cannot typically be directly discharged into the environment or water streams before proper neutralization.

In large commercial establishments where efforts are focused on expending the nixtamalization process and minimizing steeping times, corn is usually cooked at high temperatures and quenched with water to rapidly reduce corn temperatures. Although this approach shortens process times, it can increase water use and, thus, increase wastewater volumes. A typical corn nixtamalization facility processing 200 tons of corn per day uses more than 50 gal of water per minute and generates nearly the equivalent amount of alkaline wastewater in a 24-hr period.

Research is being done to find effective, economical alternatives to alkaline waste disposal. One approach has been to remove the suspended solids from the wastewater steam by vacuum filtration and then use reverse osmosis to remove dissolved solids. Membranes used in this type of system retain nearly all solids and let only water pass through. However, these membranes are expensive.

In recent years, several processes have been developed for nixtamal, masa, and masa flour production. Many of these processes have been developed to shorten the cooking or steeping process or increase production rates. In one example masa flour production process, the whole grain is partially cooked in a hot alkaline solution to partially gelatinize the starch. The corn is then de-branded, flash-dried, and milled. Several processes use ground corn or corn flour as the starting material and use extrusion or continuous cooking to produce masa or masa flour. These procedures, however, have not completely overcome the waste-generation problems associated with the traditional masa production process. Problems related to product quality, equipment and process costs, and production rates are also sometimes encountered with processes using ground corn material (flour or meal) mixed with lime or using extrusion.

To partially overcome the problem in the quality of masa and tortilla some industrial producers of instant corn flour use gums as carboxymethyl cellulose, guar, xanthan and Arabic gums to facilitate keeping properties and functionality in tortillas and helping to counteract the effects of lack of pericarp gums due to shorter steeping times during the cooking of corn grains. The flour producers remove the pericarp that affects the color of the products. However, tortilla manufacturers know that rehydrated dry masa flour has different rheological properties compared to fresh masa. Rehydrated dry masa flour is less plastic and cohesive than fresh masa. Also, the products made from dry masa flour stale faster. Similarly, the quality of the texture and flavor of tortilla made from instant corn flour is lower than that made from fresh masa.

Consequently, a need exists for a process for making masa that eliminates the lye steeping step, eliminates the discharge of caustic and wasteful effluent, shortens processing times, yet produces a masa that is Theologically similar to masa produced by the traditional nixtamalization process. Ideally, such process should be accomplished with minimal material costs and with equipment that is normally available to producers of fresh masa made by the traditional process. In short, the method should be economical, environmentally friendly, and produce an end product that is indistinguishable from the same type of product made by the traditional process.

SUMMARY OF THE INVENTION

The present invention discloses a process for the production of fresh corn masa, by means of an instantly nixtamalization process. This process minimizes the crucial steps of the traditional method, so that Theological characteristics and general quality of the traditional tortillas and tortilla chips are retained, but such that no fraction of the corn grain is lost, no polluting effluents are generated, and no steeping times are needed.

Also, with the present invention, corn endosperm gelatinization process is achieved with the minimal water quantity in no more than 30 minutes. The process is completed by a mixing unit operation at high speed which speeds diffusion of water into the internal regions of the grain fractions. Water is added in sufficient quantity to appropriately hydrate and gelatinization of starch, so no water is wasted. The combined action of water, gelatinization agents and temperature produce a cooked milled suitable for the production of fresh masa. By controlling the cooking parameters (mixing time, cooking temperature, energy, power, temperature, time, and gelatinization agents content), it is possible to obtain masa suitable for the production of fresh masa and its products.

The instant nixtamalization process offers several advantages over traditional nixtamalization processes for tortilla chip production. The essential step of cooking corn in a solution with an excess amount of lime (calcium hydroxide) is no longer required, which eliminates the production of highly alkaline waste (pH 9–12) streams (nejayote) containing suspended corn solids. Overall, the new process results in higher product yields because it eliminates corn solids losses in the waste streams.

Much of the existing equipment and setup typically used for nixtamalization and masa flour production can be used for the instant process. The process can be conveniently adapted for use with continuous cooking and mixing equipment.

Hard as well as soft corn hybrids of white or yellow dent corn types can be subjected to instant nixtamalization. For traditional nixtamalization, corn processors often prefer to use harder corn types due to reduced corn solids loss and superior flour functionality. Additionally, corn processors require integrity of the corn kernel to minimize losses and increase the process control. The instant nixtamalization process of Applicants' invention can be used with soft corn hybrids without adversely influencing corn solids loss and flour characteristics.

Masa produced using instant nixtamalization usually has a light, acceptable color and a texture similar to masa obtained by traditional method. Food products prepared from instant nixtamalized masa have an appearance, flavor, and texture similar to those prepared from many commercially available nixtamalized corns (masa). Fresh-masa table tortillas typically have subtle flavors and textures rarely duplicated by instant masa flour products. Yet, Applicants' invention can duplicate such results.

Process time using this new nixtamalization procedure has been reduced substantially from 18 hours (average) to, in one embodiment, 15 or 20 minutes. This is very important for corn products manufacturers, because they are able to make changes in their production schedule with almost no production cost impact. Additionally, quality can be controlled better in a lower production cycle time.

Using the traditional nixtamalization process 18 liters of water is required per each kilogram of raw corn to produce fresh masa. About one liter of this is retained in order to produce masa with the proper rheological characteristics suitable for making tortillas. In consequence, 17 liters of water is typically discarded and is a highly dangerous and contaminant effluent (cooking liquor or nejayote and water from washing procedure). Applicants' instant nixtamalization process eliminates all effluents. Considering that water is no easily available natural resource in some countries, the substantial reduction in the use of water with this invention (94%) has a very important ecological impact.

Thus, Applicants' process for making masa eliminates the lye steeping step, eliminates the discharge of caustic and wasteful effluent, shortens processing times, yet produces a masa that is Theologically similar to masa produced by the traditional nixtamalization process. In one embodiment, Applicants' process can be accomplished with minimal material costs and with equipment that is normally available to producers of fresh masa made by the traditional process. Applicants' method is economical, environmentally friendly, and produces an end product that is indistinguishable from the same type of product made by the traditional process.

These and other objectives and advantages of the present invention will be evident to experts in the field from the detailed description of the invention illustrated as follows.

DETAILED DESCRIPTION

Figure 1:
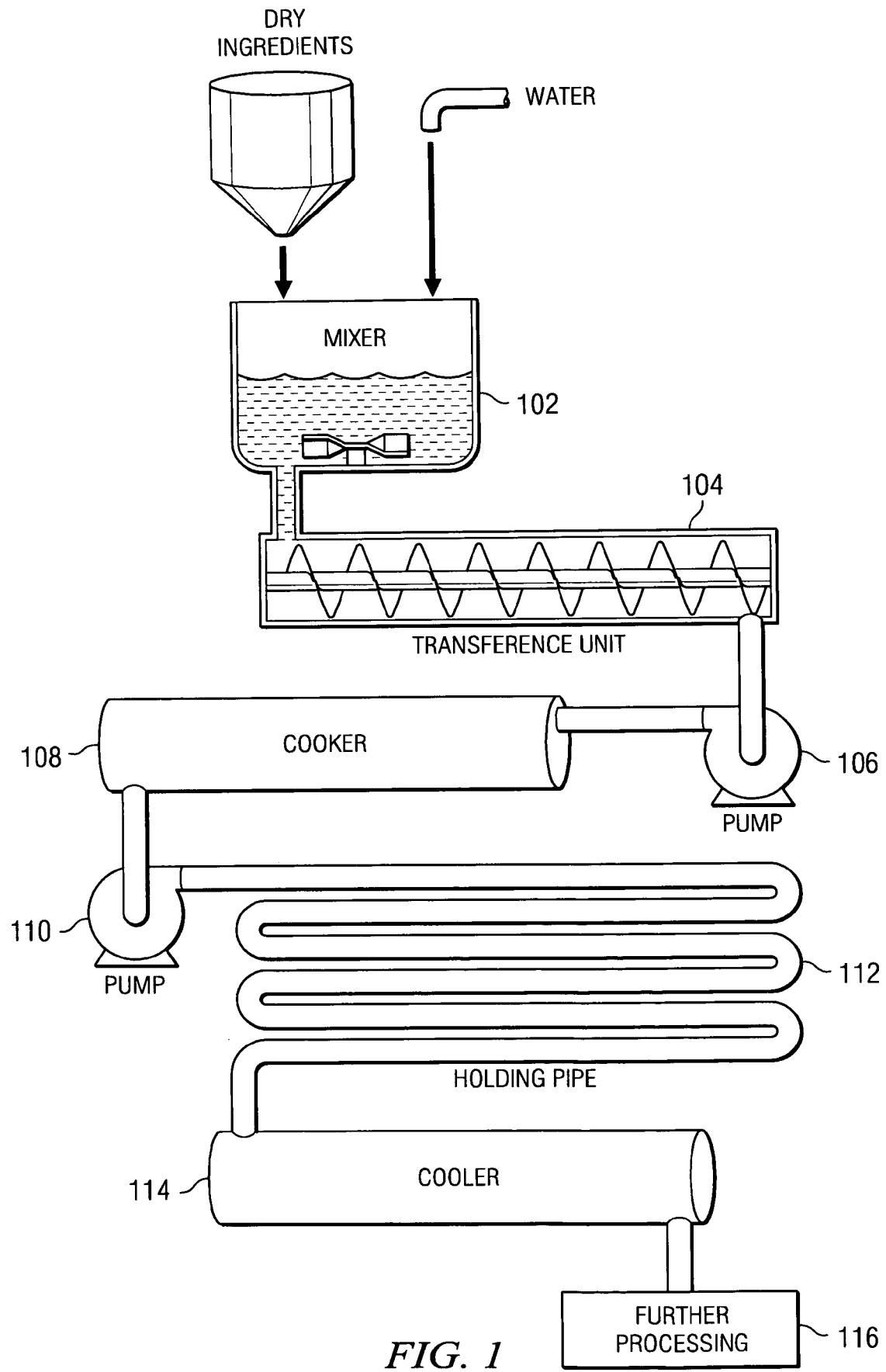
FIG. 1 is a schematic flow chart showing the processing steps of one embodiment of the present invention.

The invention refers to an instant nixtamalization process for the production of fresh corn masa, and their derivatives. With the method of the present invention it is possible to make fresh masa and its derivatives without using the lime solution steeping step.

In general the starting materials used in the process are corn pericarp, tip cap, germ, and endosperm fractions, water, and gelatinization agents. The corn fractions can be of any genotype and should be free of impurities and foreign material. These fractions of pericarp, tip cap, germ, and endosperm can be obtained by milling or decorticating the whole corn grain or by purchasing fractions from the corn dry milling or corn wet milling industries. When using the term corn "fractions" herein, it is intended that such means a specific portion of the corn kernel (such as the pericarp) that has been ground separately from other portions of the corn kernel (such as the endosperm). Thus, Applicants' use of blended corn "fractions" is distinct from the prior art practice of using ground corn kernel, or just using the endosperm fractions, when attempting to produce suitable instant masa.

As previously mentioned, corn solids are lost during the traditional nixtamalization process when the nejayote or generated effluent is discarded. The loss of these solids necessarily changes the ultimate characteristics of the masa that is produced by grinding the remaining corn. Regardless of the process used, therefore, similar masa characteristics cannot be reproduced by simply grinding whole corn to be used as a starting material for a shortened nixtamalization process, as has been suggested by the prior art. Consequently, in order to arrive at an end product having the same flavor and rheological properties as an end product produced by the traditional nixtamalization process, the instant invention uses various corn fractions in combination to mimic the characteristics of the corn that remains after the nejayote is disposed of in the traditional process.

By way of example, the traditional nixtamalization process removes much of the pericarp and some tip cap from the steeped corn kernels. Consequently, grinding corn kernels having the pericarp and tip cap intact and then subjecting it to a shortened nixtamalization process would not emulate the flavor characteristics and rheological properties of the end product when arriving at the dough produced by such procedure. Likewise, using a corn fraction consisting of only endosperm will not emulate traditionally made products, as some of the pericarp, tip cap, and germ does remain after rinsing the nixtamalized kernel. Rather than taking this approach, the instant invention uses a mixture, or blend, of corn fractions in order to reproduce the corn basis for the masa. The precise formulation for these corn fractions is dependent on the type of product to be emulated (for example, a specific formulation is used for each of corn chips, tortilla chips, and corn tortillas). In general, however, the process for production of fresh corn masa or nixtamalized corn flour of the instant invention utilizes by weight percentage a dry mixture of from about 0 to about 10% of pericarp fractions, with a preferred range of between 3 and 7%, and a most preferred amount of about 5%, from about 0 to about 15% germ fractions, with a preferred range of about 1 to about 5%, and a most preferred amount of about 3%, and from about 0 to about 95% endosperm fractions (coarse and fine grits combined), with a preferred range of about 90 to about 93%, and a most preferred amount of about 91.6%. The precise fractions used, as well as the particle size distribution of each fraction, can be adjusted by one skilled in the art in order to obtain the desired rheological properties required for the product to be made from the fresh masa.

In a preferred embodiment, the instant invention uses a mixture of fine corn grits, coarse corn grits, and a mixture of hulls (pericarp), germ, and tip-cap (hereinafter "HGT") which is a sub-product obtained from the corn milling process. This HGT component is quite inexpensive, yet is quite useful in the instant invention in mimicking a traditionally-produced masa dough.

Fine corn grits comprise an endosperm fraction, where "fine" is generally defined as the fraction of milled corn with a particle size distribution characterized by very small particles, typically on average 150 microns or below. Without limitation, and by way of example only, an example particle size distribution for fine corn grits is shown in Table 1 below.

TABLE 1

Fine Corn Grits Particle Size Distribution

| Mesh | Retention (%) |
|---|---|
| Tyler sieve No. 60 | 8.6 |
| Tyler sieve No. 70 | N.A. |
| Tyler sieve No. 80 | 30.9 |
| Tyler sieve No. 100 | 13.9 |
| Bottom | 44.2 |

Table 2 shows a component breakdown by percentage of weight for an example for fine corn grits as well.

TABLE 2

Fine Corn Grits Weight Percent

| Parameter | Min. | Max. |
|---|---|---|
| Moisture, % | 11 | 13 |
| Ashes, % | 0.4 | 0.5 |
| Fat, % | 0.9 | 1.8 |
| Protein, % | 6 | 8.5 |
| Crude fiber, % | 0.8 | 1 |
| Carbohydrates, % | 80.3 | 75.7 |

Coarse corn grits likewise comprise an endosperm fraction, where "coarse" is generally defined as the fraction of milled corn with a particle size distribution characterized by medium particle sizes, typically on average between 250 and 350 microns. Again, by way of example only, and without limitation, Tables 3 and 4 provide an example of the particle size distribution for a coarse corn grit sample and a weight percentage breakdown of the composition of said coarse corn grits.

TABLE 3

Coarse Corn Grits Particle Size Distribution

| Mesh | Retention (%) |
|---|---|
| Tyler sieve No. 16 | 0 |
| Tyler sieve No. 20 | 0 |
| Tyler sieve No. 25 | 0.1 |
| Tyler sieve No. 30 | 0.2 |
| Tyler sieve No. 40 | 36.3 |
| Tyler sieve No. 50 | 48.5 |
| Tyler sieve No. 60 | N.A. |
| Tyler sieve No. 70 | N.A. |
| Bottom | 14.9 |

TABLE 4

Coarse Corn Grits Weight Percent

| Parameter | Min. | Max. |
|---|---|---|
| Moisture, % | 11 | 13 |
| Ashes, % | 0.4 | 0.5 |
| Fat, % | 0.9 | 1.8 |
| Protein, % | 6 | 8.5 |
| Crude fiber, % | 0.8 | 1 |
| Carbohydrates, % | 80.3 | 75.7 |

The HGT component of the raw materials used with the invention is a mixture of hulls, germ and tip cap generally obtained as sub product of dry or wet corn milling process. Its composition and relative proportions of each structures (hells, germ and tip cap), depends on the nature of used corn varieties. An example of a suitable HGT component is corn bran manufactured by MAIZORO S.A. de C.V. of Mexico City. By way of example only, Tables 5 and 6 below provide detail on a sample of an HGT component with regard to particle size and component weight percentages.

TABLE 5

HGT Particle Size Distribution

| Mesh | Retention (%) |
|---|---|
| Tyler sieve No. 16 | 68.8 |
| Tyler sieve No. 20 | 8.6 |
| Tyler sieve No. 25 | 3.6 |
| Tyler sieve No. 30 | 2.8 |
| Tyler sieve No. 40 | 3.3 |
| Tyler sieve No. 50 | 2.5 |
| Tyler sieve No. 60 | N.A. |
| Tyler sieve No. 70 | N.A. |
| Bottom | 10.4 |

TABLE 6

HGT Weight Percent

| Parameter | Min. | Max. |
|---|---|---|
| Moisture, % | 8.69 | 8.68 |
| Ashes, % | 3.96 | 4.15 |
| Fat, % | 10.27 | 11.15 |
| Protein, % | 11.1 | 11.71 |
| Crude fiber, % | 6.54 | 5.96 |
| Carbohydrates, % | 59.44 | 58.35 |

Applicants' invention involves the mixing of these corn fractions with various gelatinization agents, which will be discussed in further detail below. A typical breakdown by weight percentage of the dry materials used by Applicants with the inventive processes described herein is shown below in Table 7.

TABLE 7

Formulation

| Raw Materials | % |
|---|---|
| Fine corn grits | 49.1 |
| Coarse corn grits | 42.5 |
| HGT | 8 |
| Gelatinization agents | 0.4 |
| Total | 100 |

Thus, in the embodiment disclosed, the endosperm fraction (made up of fine and coarse grits) amounts to about 91.6% by weight of the dry mixture or roughly 92% of the total weight of corn fractions used. The ratio of endosperm fraction with HGT fraction, as well as the ratio of fine to coarse grains within the endosperm fraction, can be adjusted through experimentation by one skilled in the art in order to obtain the desired characteristics of the masa produced. A preferred range for the endosperm fraction is in the range of 89 to 95% by weight of the total of corn fractions, with a most preferred range of between about 91% to about 93% by weight of the total corn fractions. A preferred range for the weight percentage of the hulls, germ, and tip cap fraction is between 5 and 11% of the total corn fractions, with a most preferred range of between about 7 and about 9% of the total corn fractions. The ratio of fine corn grits to coarse corn grits (both being part of the endosperm fraction) can vary considerably. But a preferred range is between 43% to 63% fine corn grits and 36% to 56% coarse corn grits as a weight percentage of the endosperm fraction. The most preferred ratio, as disclosed in Table 7 above, amounts to 53.6% by weight fine corn grits and 46.4% by weight coarse corn grits as a percentage of the endosperm fraction.

The first unit operation involved in Applicants' invention comprises first mixing all dry ingredients, comprising various corn fractions and gelatinization agents. This admix is then thoroughly hydrated by adding water, again in a mixer. This hydration step, in a preferred embodiment, is considered a severe mixing (or high sheer), which is required to insure thorough hydration in a short period of time. The resultant dough requires no exposure to a lye solution, nor does it produce any waste effluent.

Applicants have discovered that, in the process described herein, the use of certain metal salts as gelatinization agents provides for the instant nixtamalization process without the need for the traditional nixtamalization steeping step. One of the most effective gelatinization agents is magnesium oxide (MgO). However, the use of MgO alone does not provide for the taste of the finished product typically associated with the nixtamalization process. The use of Calcium Oxide (CaO) in combination with MgO, however, does achieve such result. Applicants have found that CaO, therefore, is a required component if the traditional flavor imparted by the nixtamalization process is desired in the end product. CaO can be combined with a number of other acceptable gelatinization agents to achieve the desired gelatinization results. Such gelatinization agents include the aforementioned and preferred MgO, as well as LiOH, NaOH, KOH, $Na_2CO_3$, $NaHCO_3$, $K_2CO_3$, $KHCO_3$, $Na_3PO_4$, $K_3PO_4$, $NaBO_3$, BeO, and SrO. In one preferred embodiment, Applicants use as the gelatinization agent component of the dry materials by weight, between 58% and 88% CaO and between 12% and 32% MgO, with a preferred ratio of about 78% CaO to about 22% MgO. A weight ratio of CaO to MgO of between about 3:1 and about 4:1 has been found to be acceptable in most applications.

In the preferred embodiment of this process, the hydrolysis and hydration of the corn fractions is achieved by subjecting the endosperm fraction with the addition of proper amounts of the HGT fraction to a rapid cooking at high temperatures. Reduction in steeping time is accomplished with high sheer mixing and temperature, which speeds diffusion of water into the internal regions of the grain fractions. As in the traditional process, starch granules are not damaged because, when grains are cooked, they are fully immersed in water, so water availability is not a limiting factor for starch granule swelling. In addition, granule swelling takes place inside the grain matrix, helping to protect them. The inclusion of the pericarp and germ enriches the textures and nutritional quality of the final product. The hydrolysis (adding gelatinization agents) of the pericarp releases gums, conferring appropriate texture to the masa with equal characteristics as those produced by the traditional process.

Water is added only in sufficient quantity to appropriately hydrate and hydrolyze the pericarp, so no water is wasted. In a preferred embodiment, between about 55 liters and about 75 liters of water is used per 100 kg of dry ingredients (corn fractions and gelatinization agents) depending on the ingredients used and the specific process parameters. Using the specific ingredients and process parameters disclosed herein, about 65 liters of water per 100 kg of dry ingredients is preferred. The combined action of water, gelatinization agents, temperature, and sheer force produces a cohesive fresh masa to be sheeted. By controlling the cooking parameters (mixing time, cooking pressure, temperature, dwell, and gelatinization agents content), it is possible to obtain masa suitable for use in producing various food products.

The processing step of cooking the corn fractions, gelatinization agents, and water can be done in a scraped surface heat exchanger cooker, microwave oven, joule cooking chamber, IR cooker or in a pressurizing chamber, etc. Thus, the cooking of the corn fractions with gelatinization agents and water can be accomplished by any type of heat transfer process, such as scraped surface heat exchanger, and can be done in any commercial equipment with temperatures varying from 50 to about 300° C. The cooking within a pressurizing chamber can be achieved under a range of pressures between 1 and 100 atmospheres, with time periods between 0 and 30 minutes employing periodical stirring, and temperature ranges between 50 to 150° C. The microwave oven for corn fraction cooking can be a commercial one with power ranging from 500 watts to several Kilowatts, depending on the mass load. The cooking containers inside microwave ovens must withstand temperatures from 50 to 120° C., and heating periods of 1 to 60 minutes. Additionally, gelatinization of starch can be achieved in the preferred embodiment using a mixture of calcium oxide and magnesium oxide and/or other metal salts.

In one embodiment, the corn fractions and gelatinization agents are hydrated in the presence of water at room temperature, for a period between 1 and 7 minutes. Also, in this hydration step, a pressurizing chamber can be used. The chamber can be fitted with a device that allows the administration of heat by any vehicle, such as hot water, direct fire, hot vapor, joule heating, infrared radiation, microwave radiation, or any other heating system. Similarly, the pressurizing chamber can use an inert gas in order to increase the pressure and to reduce the cooking time.

The concentration of the gelatinization agent may vary from 0.1 to 4% by weight of the dry admix and can be substituted by any other compound causing pericarp hydrolysis and hydration of the germ-endosperm fractions in presence of water. The concentration of the gelatinization agent recommended in a preferred embodiment is about 0.3% to about 0.4% by weight of dry raw materials (admix). Water concentration used for hydration can vary from 10% to 70% by weight, with a preferred amount of about 50%, and its temperature can range from 0 to 100° C., with a preferred range of 20 to 30° C.

One embodiment of Applicants' invention is best understood with reference to FIG. 1, which is a schematic flow chart highlighting the various unit operations involved. First, the dry components (fine corn grits, coarse corn grits, HGT, and a mixture of gelatinization agents) are introduced into a mixer 102 for thorough blending of the dry ingredients. The preferred order of addition of the dry components is first the fine corn grits, then the coarse corn grits, then the HGT fraction, and lastly the gelatinization agents, although this order is not required. The mixer 102 can be, for example, a ribbon blender, in which instance the dry mixture should be blended for approximately 3 to 5 minutes at between 100–150 rpm. This dry mixture is then hydrated by the addition of water to the mixer 102. In a preferred embodiment, the water is added at ambient temperature in a ratio of 65 liters of water per each 100 kilograms of dry ingredients. The amount of water can be adjusted in order to arrive at the proper consistency of the end product with the goal in mind that substantially all water added is retained by the masa produced, such that no waste water by product is generated. Again, using the example of a ribbon blender, the hydration step typically ranges between 5 and 7 minutes long at a mixing speed of 100 to 120 rpm, which characterizes a severe mixing or high sheer mixing. The moisture level of the hydrated admix in a preferred embodiment is approximately 50% by weight.

While this mixing and hydration step is described herein as a batch unit operation, it should be understood to those skilled in the art that a continuous mixing process could likewise be used. In the instance of a batch mixing unit operation, one or more mixers 102 can be emptied into a transference unit 104, such as an auger or screw conveyor, in order to make the entire operation continuous. This transference unit 104 collects the hydrated admix, which is then transferred by a pump 106 or other means to a cooker 108.

The cooker 108 in a preferred embodiment is a scraped surface heat exchanger which uses hot water as its energy source. This hot water (not shown) enters the heat exchanger at about 55° C. to about 80° C., or in a preferred range of about 68° C. to about 72° C. The hydrated admix is maintained at a pressure, in a preferred embodiment, of 50 to 60 psig and departs the cooker 108 as a partially gelatinized dough with a temperature in the range of about 60° C. to about 75° C., and preferably between about 69° C. and about 70° C. This dough is then transferred by a pump 110 or other means into a holding pipe 112 or other holding equipment known in the art in order to allow the cooking and gelatinization processes to run their course. In one embodiment, the holding pipe is a stainless steel pipe 12 meters in length and 2.5 inches in diameter. The dwell time in such holding pipe should be in the range of 3 to 12 minutes, preferably between 5 and 9 minutes, and most preferably for about 7 minutes. The dough exits the holding pipe 112 at the desired level of gelatinization needed for the further processing 116 required to produce the end product. In other words, the dough that exits the holding pipe 112 is now fresh masa having the same rheological properties and other characteristics of masa made through the traditional nixtamalization process. Applicants determine if the masa at this stage is of the proper characteristics, including rheological characteristics, by evaluation using "RVA" profiles. RVA refers to Rapid Visco-Analyzer, which is an apparatus commonly used in the industry to characterize viscosity behavior. RVA profiles are well known in the food industry as a tool for investigating the hydration and gelling behavior of starches. The RVA method typically involves controlled heating and cooling of flour or starch suspensions in water at concentrations of between 5 and 40% w/w. If, in fact, the masa demonstrates the RVA profile desired, gelatinization must be stopped at this stage to prohibit further changes in the characteristics of the masa and further gelatinization.

In order to stop the gelatinization process at this point, the masa is then put through a cooler 114, which in a preferred embodiment is again a scraped surface heat exchanger. This heat exchanger uses cold water (not shown) at a temperature in the range of between 3° C. and 10° C., or a preferred range between 5° C. and 7° C., in order to cool the dough to below 50° C., but preferably to about 40° C. The dough pressure inside the cooler 114 is typically between 60 and 100 psig, with a preferred pressure range of between 70 and 80 psig.

When the masa exits the cooler 114, it is now fully processed and cooled fresh masa having rheological properties quite similar to that of masa produced by the traditional nixtamalization process. The process beginning with the hydration step to the end of the cooling step typically takes between about 20 and about 25 minutes and no water is wasted. The moisture level of such masa at this point is approximately 47%.

The masa is then used in further processing steps 116 for which masa produced by the traditional nixtamalization steps are applied. For example, these further processing steps 116 might include sheeting, cutting, drying, frying, seasoning, and packaging in a manner typical and known in the art for producing tortilla chips. Alternatively, the masa can be extruded and cooked or processed in any number of different manners known in the art for the production of corn chips, corn tortillas, taco shells, tamales, tortilla chips, and the like.

The present invention involves a method that minimizes the crucial steps of the traditional method, so the rheological characteristics and general quality of the traditional tortillas are retained. Yet, no fraction of the corn grain is lost, no polluting effluents are generated, and no long steeping times are needed, thus saving energy as well. Instant nixtamalization offers a new approach to nixtamalization in which problems with waste generation are virtually eliminated, since substantially all the water added at the hydration step is retained in the masa produced, while still producing a product similar to traditionally lime-cooked masa can be produced.

A successful instant nixtamalization process suitable for processing milled corn fractions to produce fresh masa has been developed. The system can be used to produce masa foods and snack products, such as corn tortillas, tortilla chips, corn chips, and taco shells. Masa produced with new technology has characteristics similar to traditional masas. The instant nixtamalization process eliminates the need to cook corn in a lime solution and resultant alkaline waste and wastewater generation. Instant nixtamalization offers an alternative to traditional nixtamalization that can reduce waste generation at its source, use less energy to produce, and minimize investment in expensive waste-treatment systems.

What is claimed is:

1. A method for making fresh corn masa, said method comprising the steps of:
   a) Mixing corn fractions with CaO and MgO, thereby forming a corn-based admix;
   b) Hydrating said corn-based admix;
   c) Heating said hydrated corn-based admix to a temperature of between about 50° C. and about 150° C.;
   d) Holding said hydrated corn-based admix at a temperature of between about 50° C. and about 150° C. for between 0 and about 30 minutes;
   e) Cooling said hydrated corn-based admix immediately after said holding step d) to below 50° C., thereby making fresh masa.

2. The method of claim 1 wherein the CaO and MgO comprise between about 0.3% and about 0.4% by weight of said corn-based admix of step a).

3. The method of claim 2 wherein the weight ratio of CaO to MgO of step a) is between about 3:1 and about 4:1.

4. The method of claim 1 wherein the hydrating of step b) comprises adding between 55 liters and 75 liters of water per 100 kg of corn-based admix.

5. The method of claim 4 wherein said water is added at between about 20° C. and about 30° C.

6. The method of claim 1 wherein said hydrating of step b) comprises mixing water with said corn-based admix for between about 1 and about 7 minutes.

7. The method of claim 1 wherein steps b) through e) are accomplished from between about 20 and about 25 minutes.

8. The method of claim 1 wherein substantially all the water added at the hydrating of step b) is retained in the fresh masa produced at step e).

9. The method of claim 1 wherein the admix is heated in step c) to between about 55° C. and about 80° C.

10. The method of claim 1 wherein the heating of step c) takes place under a pressure of between about 50 psig to about 60 psig.

11. The method of claim 1 wherein the holding of step d) occurs at between about 60° C. and about 75° C. for between about 5 and about 9 minutes.

12. The method of claim 1 wherein the holding of step d) takes place until the hydrated corn-based admix exhibits a desired RVA profile.

13. A method for making fresh corn masa, said method comprising the steps of:
   a) Mixing corn fractions comprising fine grits and coarse grits;
   b) Mixing said corn fractions with CaO and MgO, thereby forming a corn-based admix;
   c) Hydrating said corn-based admix;
   d) Heating said hydrated corn-based admix to a temperature of between about 50° C. and about 150° C.;
   e) Holding said hydrated corn-based admix at a temperature of between about 50° C. and about 150° C. for between about 0 and about 30 minutes;
   f) Cooling said hydrated corn-based admix immediately after said holding step e) to below 50° C., thereby making fresh masa.

14. The method of claim 13 wherein the CaO and MgO comprise between about 0.3% and about 0.4% by weight of said corn-based admix of step b).

15. The method of claim 14 wherein the weight ratio of CaO to MgO of step b) is between about 3:1 and about 4:1.

16. The method of claim 13 wherein the hydrating of step c) comprises adding between 55 liters and 75 liters of water per 100 kg of corn-based admix.

17. The method of claim 16 wherein said water is added at between about 20° C. and about 30° C.

18. The method of claim 13 wherein said hydrating of step c) comprises mixing water with said corn-based admix for between about 1 and about 7 minutes.

19. The method of claim 13 wherein steps c) through f) are accomplished from between about 20 and about 25 minutes.

20. The method of claim 13 wherein substantially all the water added at the hydrating of step c) is retained in the fresh masa produced at step f).

21. The method of claim 13 wherein the admix is heated in step d) to between about 55° C. and about 80° C.

22. The method of claim 13 wherein the heating of step d) takes place under a pressure of between about 50 psig to about 60 psig.

23. The method of claim 13 wherein the holding of step e) occurs at between about 60° C. and about 75° C. for between about 5 and about 9 minutes.

24. The method of claim 13 wherein the holding of step e) takes place until the hydrated corn-based admix exhibits a desired RVA profile.

25. The method of claim 13 wherein the corn fractions of step a) comprise a pericarp fraction of between about 3% to about 7% by weight of the corn-based admix of step b).

26. The method of claim 13 wherein the corn fractions of step a) comprise a germ fraction of between about 1% to about 5% by weight of the corn-based admix of step b).

27. The method of claim 13 wherein the corn fractions of step a) comprise an endosperm fraction of between about 90% to about 93% by weight of the corn-based admix of step b).

* * * * *